(12) United States Patent
Zhou

(10) Patent No.: US 9,414,329 B2
(45) Date of Patent: *Aug. 9, 2016

(54) AUTONOMOUS POWER ADAPTATION IN A HETEROGENEOUS CELLULAR ENVIRONMENT

(71) Applicant: AirHop Communications, Inc., San Diego, CA (US)

(72) Inventor: Fei Frank Zhou, Milpitas, CA (US)

(73) Assignee: AirHop Communications, Inc., San Diego, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/483,517

(22) Filed: Sep. 11, 2014

(65) Prior Publication Data

US 2015/0065189 A1 Mar. 5, 2015

Related U.S. Application Data

(63) Continuation of application No. 13/329,004, filed on Dec. 16, 2011, now Pat. No. 8,862,134.

(60) Provisional application No. 61/423,890, filed on Dec. 16, 2010.

(51) Int. Cl.
| | |
|---|---|
| *H04B 7/00* | (2006.01) |
| *H04W 52/24* | (2009.01) |
| *H04W 52/36* | (2009.01) |
| *H04B 17/318* | (2015.01) |
| *H04W 36/00* | (2009.01) |
| *H04W 24/02* | (2009.01) |
| *H04W 16/32* | (2009.01) |

(52) U.S. Cl.
CPC ........... *H04W 52/245* (2013.01); *H04B 17/318* (2015.01); *H04W 52/367* (2013.01); *H04W 16/32* (2013.01); *H04W 24/02* (2013.01); *H04W 52/244* (2013.01)

(58) Field of Classification Search
CPC .......................................................... H04B 7/00
USPC .......................................................... 455/552
See application file for complete search history.

(56) References Cited

U.S. PATENT DOCUMENTS

| 8,600,393 B2 * | 12/2013 | Liu | H04W 16/14 370/329 |
|---|---|---|---|
| 8,849,336 B2 * | 9/2014 | Carmon | H04W 52/143 455/435.1 |
| 2007/0270151 A1 * | 11/2007 | Claussen | H04W 16/32 455/444 |

* cited by examiner

*Primary Examiner* — Huy C Ho
(74) *Attorney, Agent, or Firm* — Van Pelt, Yi & James LLP

(57) ABSTRACT

Autonomous power adaptation in a heterogeneous cellular environment is disclosed. In some embodiments, autonomous power adaptation for a first small area cellular device in a heterogeneous cellular environment includes collecting received signal strength information for one or more neighboring large area cellular devices and one or more neighboring small area cellular devices; and determining a maximum transmit power for the first small area cellular device that minimizes interference with the one or more neighboring large area cellular devices and the one or more small area cellular devices, in which determining the maximum transmit power for the first small area cellular device that minimizes interference with the one or more neighboring large area cellular devices and the one or more small area cellular devices includes prioritizing the one or more neighboring large area cellular devices over the one or more neighboring small area cellular devices.

18 Claims, 9 Drawing Sheets

AUTONOMOUS POWER ADAPTATION IN A HETEROGENEOUS CELLULAR ENVIRONMENT

CROSS REFERENCE TO OTHER APPLICATIONS

This application is a continuation of co-pending U.S. patent application Ser. No. 13/329,004, entitled AUTONOMOUS POWER ADAPTATION IN A HETEROGENEOUS CELLULAR ENVIRONMENT filed Dec. 16, 2011, which claims priority to U.S. Provisional Patent Application No. 61/423,890 entitled HOME NODEB (HNB) POWER ADAPTATION filed Dec. 16, 2010, which are incorporated herein by reference for all purposes.

BACKGROUND OF THE INVENTION

In a wireless network, base stations provide the link necessary for the terminal to send and receive data. Typically, these base stations are static in that they are not turned on or off. Furthermore, when base stations are on, the transmission does not cease and restart. Also, additions and deletions of base stations are infrequent. As data throughput increases and base station density increases, there is more overlap of the cell coverage area. Also, applications increasingly require higher quality of services (QoS). Higher QoS generally requires higher spectrum efficiency. To provide for this, there will need to be more base stations.

BRIEF DESCRIPTION OF THE DRAWINGS

Various embodiments of the invention are disclosed in the following detailed description and the accompanying drawings.

DETAILED DESCRIPTION

Figure 1:
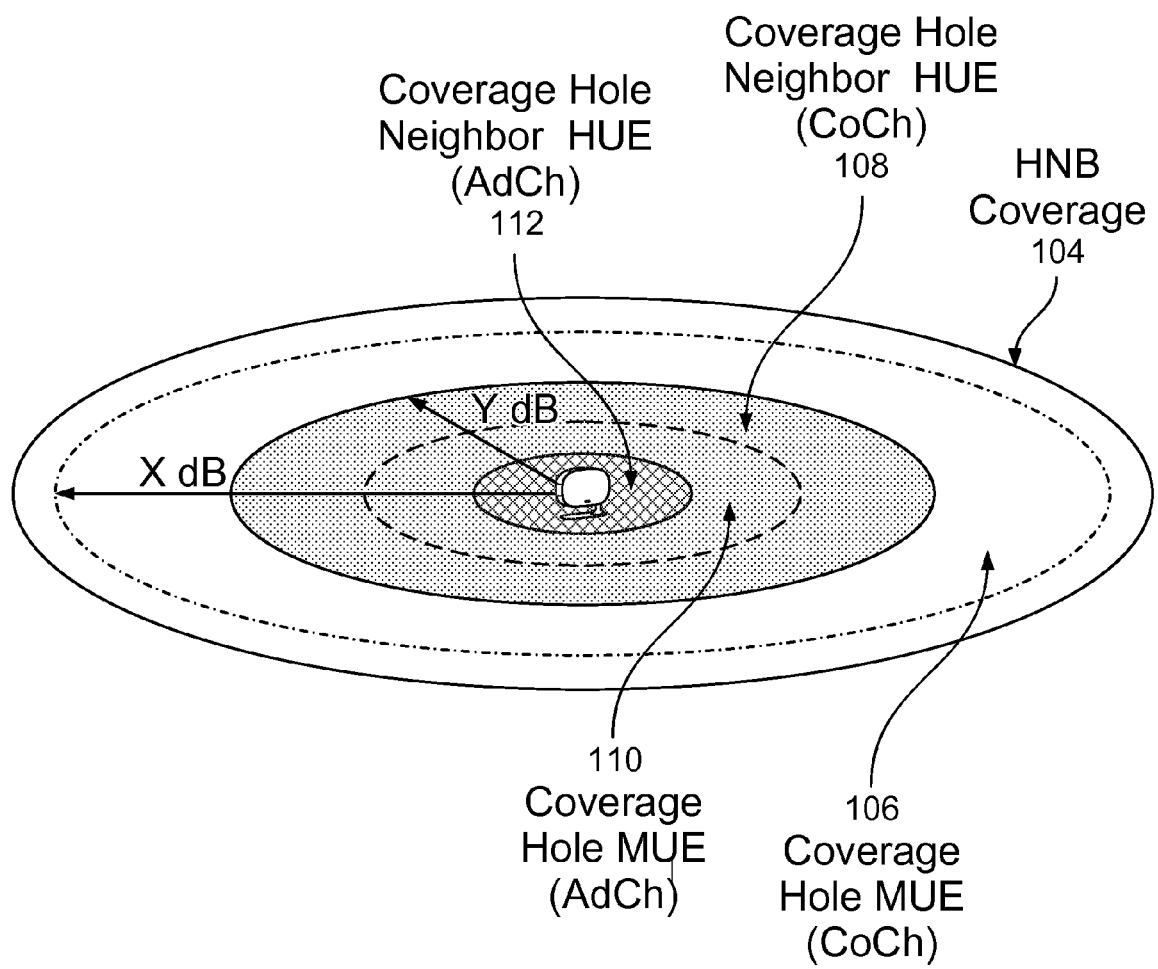
FIG. 1 illustrates Home NodeB (HNB) coverage and dead zones for providing power adaptation with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

With an increasing number of wireless communication devices, such as small area cellular devices (e.g., femtocells, picocells, and microcells) as well as large area cellular devices (e.g., macrocells) being deployed in wireless networks, more power is being transmitted and used. Furthermore, such increasing transmission can lead to greater interference (e.g., in areas of transmission spectrum overlap). For example, femtocells and/or picocells can also interfere with each other (e.g., radio frequency (RF) interference) due to unplanned deployment and uncoordinated deployment by different users or entities (e.g., different residents in a housing development or apartment complex). Accordingly, various techniques are disclosed herein to, for example, reduce base station transmissions interference with neighboring macrocells and other neighboring base stations (e.g., neighboring femtocells, picocells, and/or microcells). For example, by reducing a transmit power for a femtocell, there can be a reduction of interference, which can also increase the QoS. Also, autonomous techniques for power adaptation for a small area cellular device (e.g., a femtocell, picocell, or microcell) are provided to reduce RF interference problems that increasingly arise in unplanned heterogeneous cellular environments.

In some embodiments, techniques for wireless communication are provided, particularly related to small area cellular devices, such as a base station, access point, relay node or relay station, with different air-interfaces, functionality, or configurations. As used herein, the term "base station" generally refers to, for example and without limitation, any "femtocell", "picocell", "microcell", and/or other similar types of base station devices, and also includes, for example and without limitation, non-cellular stations, such as access points, relay points, repeater devices, relay stations, and/or other similar types of non-cellular stations. As used herein, the term "terminal" generally refers to, for example and without limitation, any device (e.g., user equipment (UE)) communicating wirelessly with a base station or another terminal in the case of a peer-to-peer environment. Various embodiments disclosed herein, for example, provide for enhanced base stations and relays by facilitating the reduction of interference with neighboring base stations, such as nearby femtocells, picocells, microcells, and macrocells.

FIG. 1 illustrates Home NodeB (HNB) (e.g., a 3G femtocell) coverage and dead zones. As shown, the HNB coverage and dead zones for a given device (e.g., a femtocell, a picocell, or a microcell) is shown illustrating the HNB coverage 104, the coverage hole caused by the HNB for macro user equipments (MUEs) from neighboring macrocells operating in co-channel (CoCh) 106, the coverage hole caused by the HNB for home user equipments (HUEs) from neighboring femtocells or picocells operating in co-channel (CoCh) 108, the coverage hole caused by the HNB for MUEs from neighboring macrocells operating in adjacent channels (AdCh) 110, and the coverage hole caused by the HNB for HUEs from neighboring femtocells or picocells operating in adjacent channels (AdCh) 112.

In some embodiments, power adaptation for a small area cellular device (e.g., a femtocell, picocell, or microcell) in a heterogeneous cellular environment includes determining a transmit power level based on prioritizing the one or more neighboring macrocells over the one or more neighboring femtocells and neighboring picocells as further described herein with respect to various embodiments. For example, using this approach, a transmit power for a femtocell can be set so as to ensure that a neighboring macrocell's coverage is protected with a higher priority over neighboring femto/picocells (e.g., to ensure that a femtocell does not unnecessarily disrupt a cellular device's communication with the neighboring macrocell). In some examples, the macrocell interference is not a significant concern (e.g., not within a coverage area of a macrocell), but neighboring small area cellular devices (e.g., other femtocells or other picocells) may be within a coverage area and such interference calculations can be determined to minimize the coverage hole(s) created for such neighboring femtocells or picocells.

In some embodiments, power adaptation for a small area cellular device in a heterogeneous cellular environment further includes using sniffer reports to determine transmit power adjustments as further described herein with respect to various embodiments. For example, a small area cellular device can measure signal strength of neighboring devices, such as a pilot signal, to generate sniffer reports for each neighboring devices for which signals can be detected.

In some embodiments, power adaptation for a small area cellular device in a heterogeneous cellular environment further includes using measurement reports received from one or more user equipment (UE) devices based to fine tune transmit power adjustments for the small area cellular device as further described herein with respect to various embodiments. For example, using measurement reports received from served UE devices, further fine tuning of the transmit power of the small area cellular device can be implemented using various techniques described herein.

Accordingly, autonomous power adaptation (e.g., for small area cellular devices, such as femtocells, picocells, and microcells) in a heterogeneous cellular environment is disclosed. In some embodiments, a system, process, or computer program product for autonomous power adaptation for a first small area cellular device in a heterogeneous cellular environment includes collecting received signal strength information for one or more neighboring large area cellular devices and one or more neighboring small area cellular devices; and determining a maximum transmit power for the first small area cellular device that minimizes interference with the one or more neighboring large area cellular devices and the one or more small area cellular devices, in which determining the maximum transmit power for the first small area cellular device that minimizes interference with the one or more neighboring large area cellular devices and the one or more small area cellular devices includes prioritizing the one or more neighboring large area cellular devices over the one or more neighboring small area cellular devices, in which the first small area cellular device includes a femtocell, a picocell, or a microcell, in which the one or more neighboring small area cellular devices includes a femtocell, a picocell, and/or a microcell, and in which the neighboring large area cellular devices include one or more macrocells.

In some embodiments, a system, process, or computer program product for autonomous power adaptation for a small area cellular device (e.g., femtocells, picocells, and microcells) in a heterogeneous cellular environment includes collecting sniffer measurement for one or more neighboring femtocells and one or more neighboring picocells; and determining a maximum transmit power for the first femtocell such that a measured signal quality strength at the first femtocell cell boundary exceeds a predefined threshold using a compensation factor for sniffer measurements for the one or more neighboring femtocells and the one or more neighboring picocells, in which the compensation factor adjusts for a power loss over a distance based on a configurable radius of the one or more neighboring femtocells and the one or more neighboring picocells.

In some embodiments, a system, process, or computer program product for autonomous power adaptation for a small area cellular device (e.g., femtocells, picocells, and microcells) in a heterogeneous cellular environment includes collecting measurement reports for one or more user equipment devices in communication with the femtocell; and periodically adjusting a maximum transmit power for the femtocell based on one or more measurement reports for the one or more user equipment devices based on a threshold to fine tune transmit power adjustments for the femtocell.

In some embodiments, an HNB sniffer reports a co-channel or adjacent channel pilot signal strength (e.g., Common PIlot CHannel (CPICH) Ecp/Io in Universal Mobile Telecommunications Standard (UMTS) greater than −18 decibels (dB), in which Ecp refers to the Received Signal Code Power (RSCP) or Received Pilot Signal and Io refers to the Received Signal Strength Indicator (RSSI) or total received (Rx) power). In some embodiments, the HNB max transmit (Tx) power (Pmax) is determined to be at a level to maintain an Ecp/Io of −18 dB for a co-channel MUE located X dB (e.g., in which X is predefined and configurable) away from the HNB (e.g., to protect the co-channel macro user), and to maintain an Ecp/Io of −18 dB for a MUE on the adjacent channel, located (X-33) dB (ACLR (Adjacent Channel Leakage Ratio)=45 dBc, ACS (Adjacent Channel Selectivity)=33 dB→ACIR (Adjacent Channel Interference Ratio)=33 dB) away from the HNB (i.e. to protect the adjacent channel macro user), and Pmax<=15 dBm. In some embodiments, Pmax is set based on the HNB sniffer reports of Best Macro CPICH RSCP, Best Macro CPICH Ec/Io (e.g., co-channel or adjacent channel).

Figure 2:
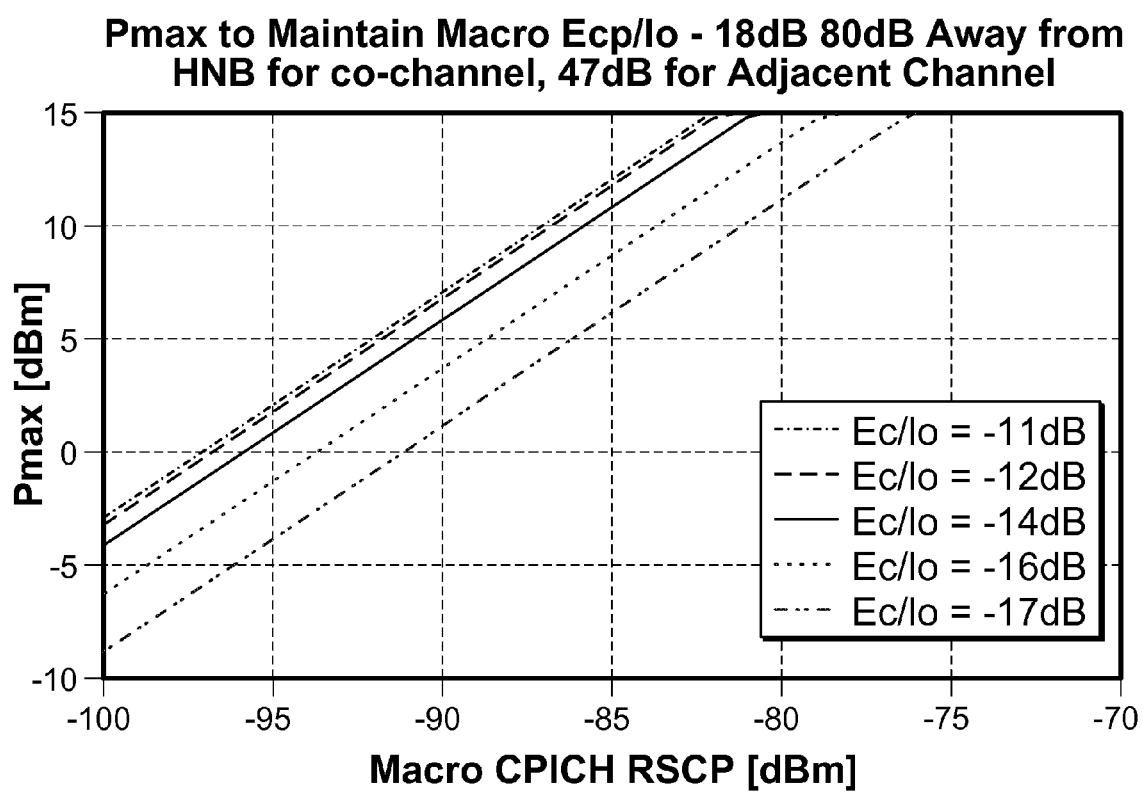
FIG. 2 is a chart illustrating Pmax vs. macro CPICH RSCP to maintain Ecp/Io at −18 dB at 80 dB away from HNB for co-channel and 47 dB for adjacent channel in accordance with some embodiments.

FIG. 2 is a chart illustrating Pmax vs. macro CPICH RSCP to maintain Ecp/Io at −18 dB at 80 dB away from HNB for co-channel and 47 dB for adjacent channel in accordance with some embodiments.

Figure 3:
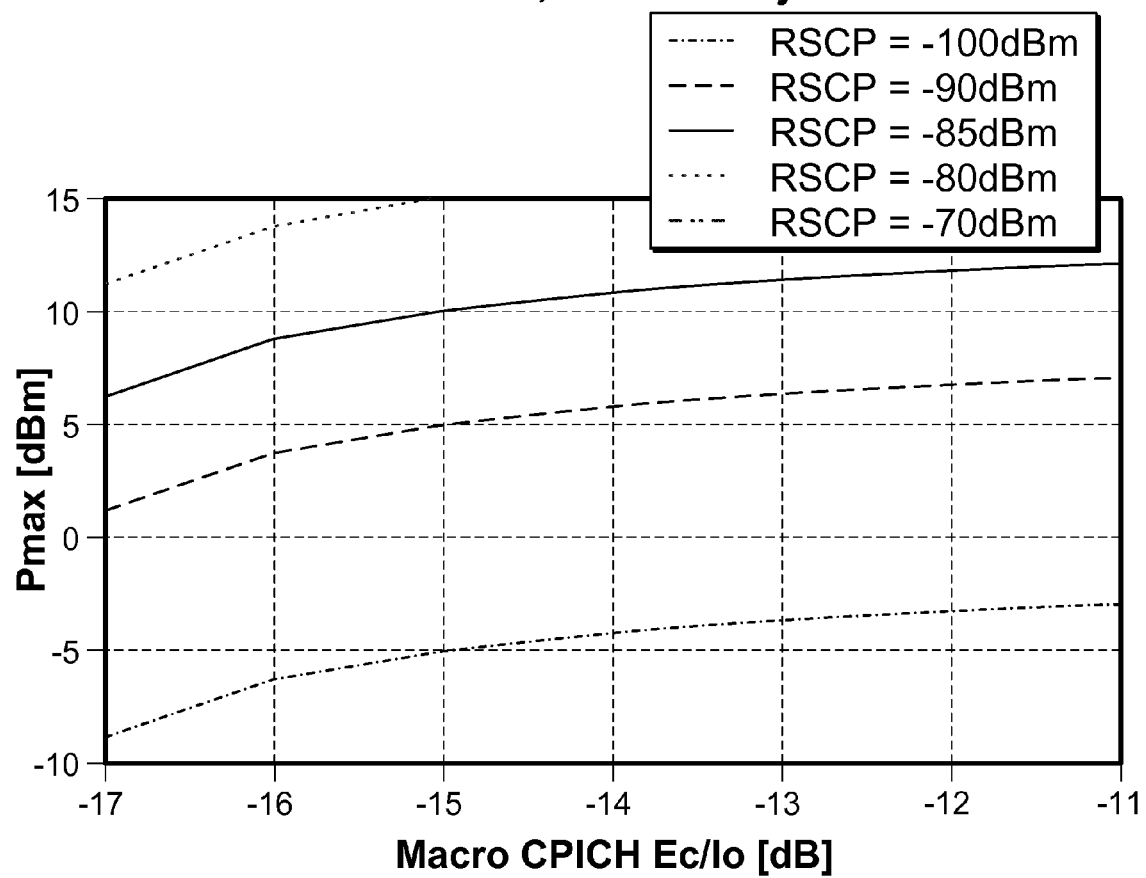
FIG. 3 is a chart illustrating Pmax vs. macro CPICH Echo to maintain a macrocell Ecp/Io at −18 dB at 80 dB away from HNB for co-channel and 47 dB for adjacent channel in accordance with some embodiments.

FIG. 3 is a chart illustrating Pmax vs. macro CPICH Ec/Io to maintain a macrocell Ecp/Io at −18 dB at 80 dB away from HNB for co-channel and 47 dB for adjacent channel in accordance with some embodiments.

Figure 5:
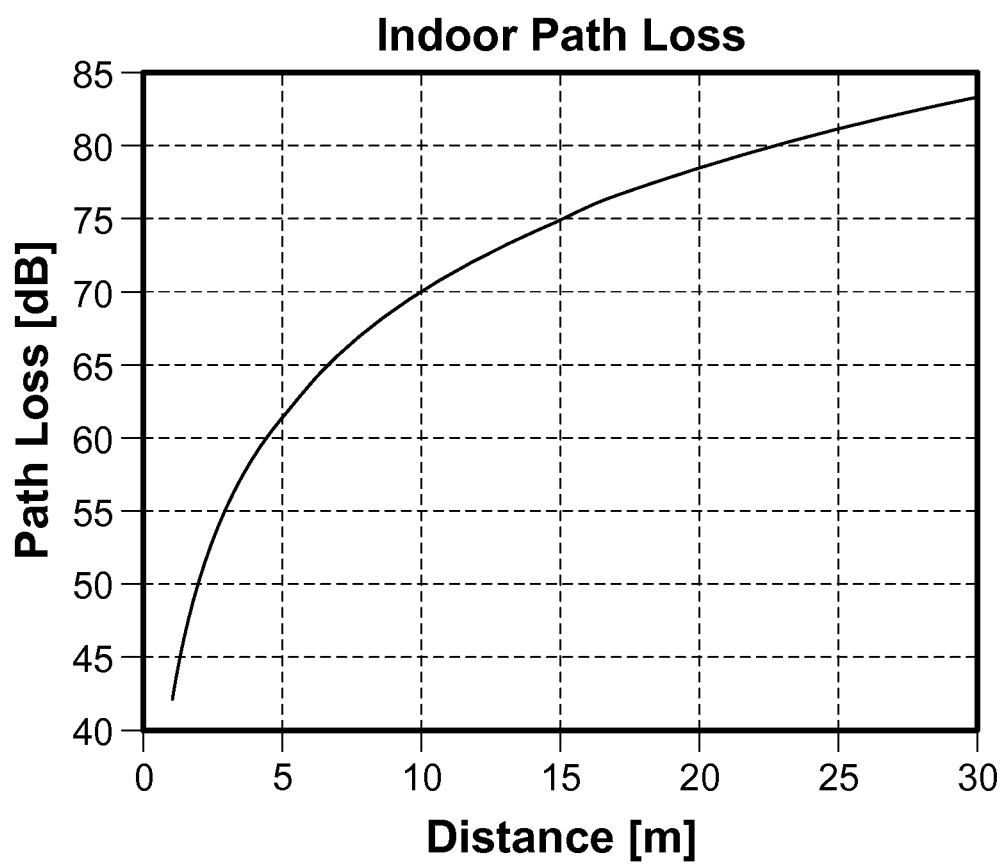
FIG. 5 is a chart illustrating indoor path loss vs. distance.

With respect to FIGS. 2 and 3, X is assumed to be 80 dB, which is ~20 m for indoor path loss as shown in FIG. 5, which provides a chart illustrating indoor path loss vs. distance. In particular, FIGS. 2 and 3 provide different plots of the below equation as shown in the respective charts.

$$\frac{RSCP}{\frac{P\max}{ACIR*(X-33)\text{dB}} + RSSI} = -18 \text{ dB}$$

$$P\max = \min(15, X \text{ dB} + RSCP + 10*\log10(10^{\wedge}1.8 - 10^{\wedge}(-0.1*Ec/Io)))$$

Figure 4:
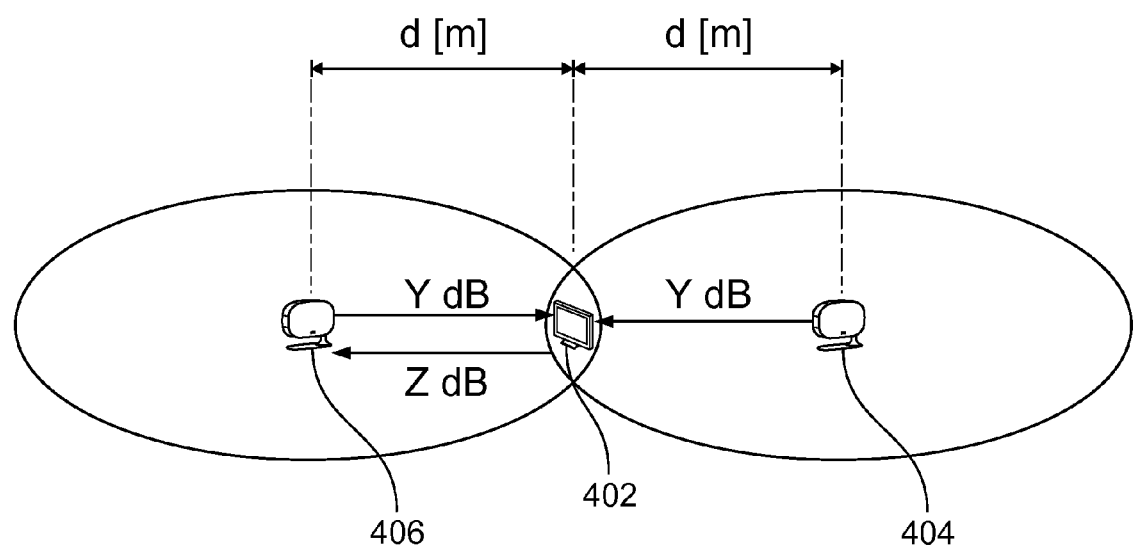
FIG. 4 illustrates coverage and path loss for two HNB devices in accordance with some embodiments.

FIG. 4 illustrates coverage and path loss for two HNB devices (e.g. femtocells) in accordance with some embodiments. As shown, UE device 402 is at the cell boundary of a femtocell 404 and another femtocell 406. For example, if the HNB sniffer reports the co-channel best macro CPICH Ec/Io<=−18 dB and both adjacent channel best macro CPICH Ec/Ios<=−18 dB and a Co-Channel or Adjacent Channel Best HNB CPICH Ec/Io>−16 dB, then various techniques as described herein can be applied to set the transmit power for the small area cellular device. For example, the HNB Max Tx Power (Pmax) can be set to maintain an Ecp/Io of −16 dB for a co-channel Neighbor HUE located Y dB (e.g., in which Y is predefined and configurable) away from the HNB (e.g., to protect the co-channel neighbor HNB user) and to maintain an Ecp/Io of −16 dB for a neighbor HUE on the adjacent channel, located (Y-33) dB (ACLR=45 dBc, ACS=33 dB→ACIR=33 dB) away from the HNB (e.g., to protect the adjacent channel Neighbor HNB user), and Pmax<=15 dBm (e.g., 0-15 dBm for femtocells). The Pmax can be set based on the HNB sniffer reports of best HNB CPICH RSCP, best HNB CPICH Ec/Io (co-channel, or adjacent channel).

Figure 6:
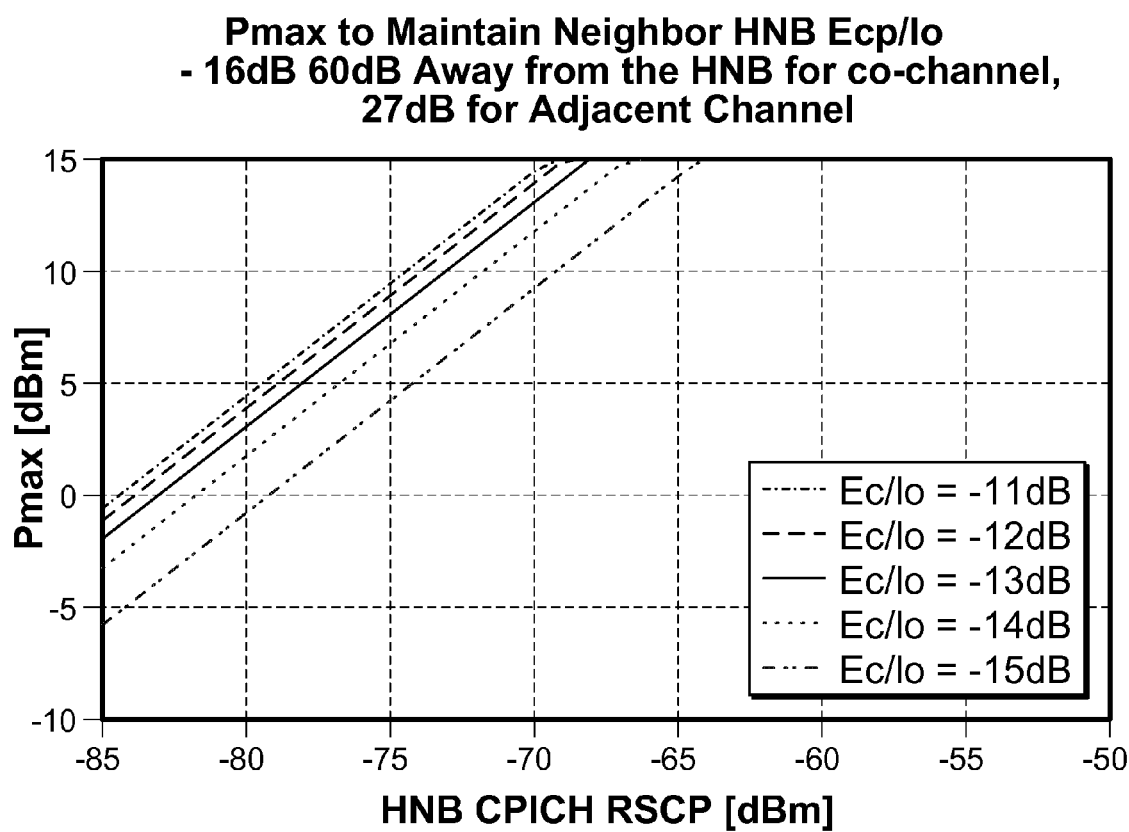
FIG. 6 is a chart illustrating Pmax vs. HNB CPICH RSCP to maintain a neighbor HNB Ecp/Io at −16 dB at 60 dB away from HNB for co-channel and 27 dB for adjacent channel in accordance with some embodiments.

FIG. 6 is a chart illustrating Pmax vs. HNB CPICH RSCP to maintain a neighbor HNB Ecp/Io at −16 dB at 60 dB away from HNB for co-channel and 27 dB for adjacent channel in accordance with some embodiments.

Figure 7:
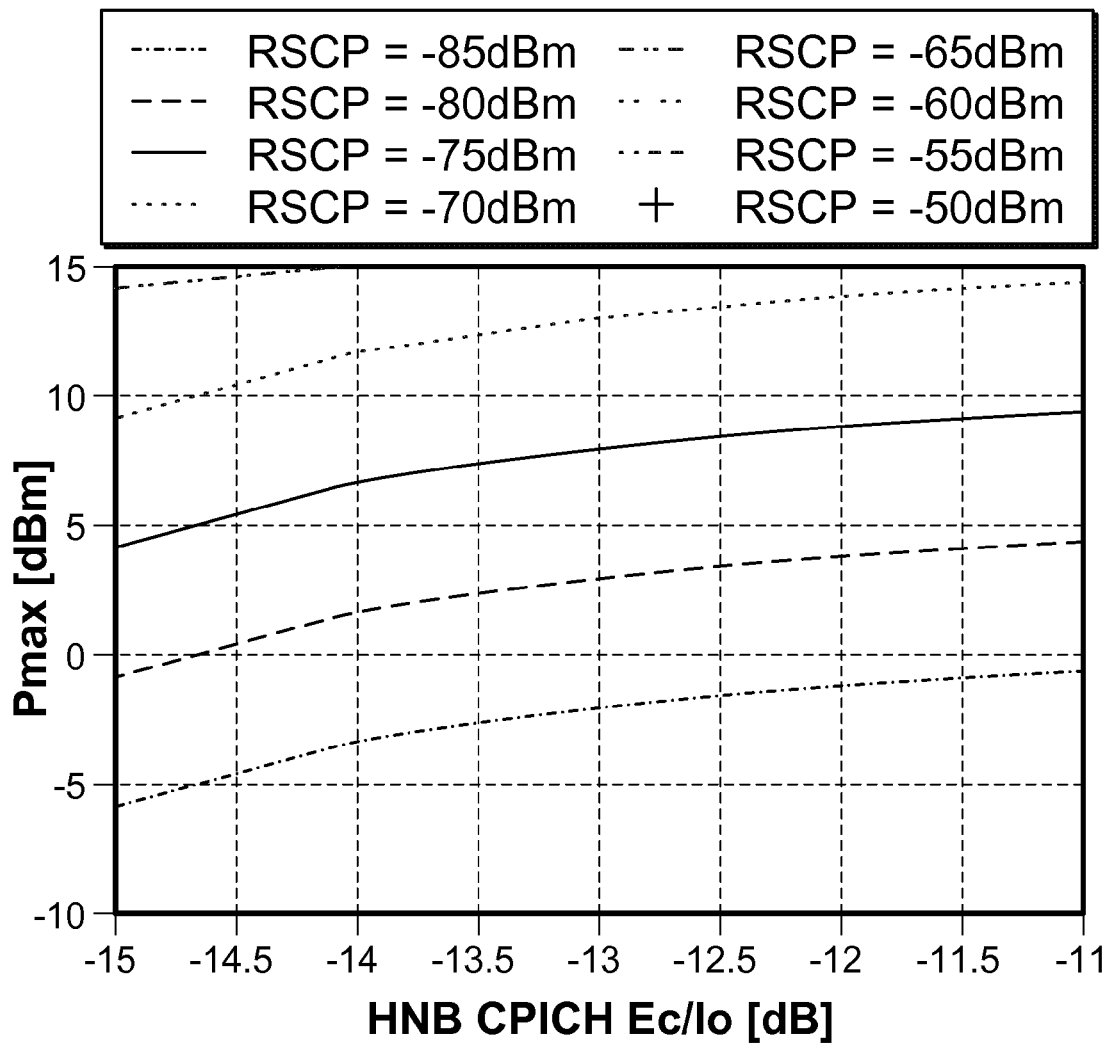
FIG. 7 is a chart illustrating Pmax vs. HNB CPICH Echo to maintain a neighbor HNB Ecp/Io at −16 dB at 60 dB away from HNB for co-channel and 27 dB for adjacent channel in accordance with some embodiments.

FIG. 7 is a chart illustrating Pmax vs. HNB CPICH Ec/Io to maintain a neighbor HNB Ecp/Io at −16 dB at 60 dB away from HNB for co-channel and 27 dB for adjacent channel in accordance with some embodiments.

With respect to FIGS. 6 and 7, Y is assume to be 60 dB (e.g., ~5 m for indoor as shown in FIG. 5). In particular, FIGS. 6 and 7 provide different plots of the below equation as shown in the respective charts.

$$\frac{RSCP + Z \text{ dB}}{\frac{P\max}{ACIR*(Y-33)\text{dB}} + (RSSI + Z \text{ dB})} = -16 \text{ dB}$$

$$P\max = \min(15, Y \text{ dB} + Z \text{ dB} + RSCP + 10*\log10(10^{\wedge}1.6 - 10^{\wedge}(-0.1*Ec/Io)))$$

For Y=60 dB, d=5 m, Z=10 dB, where Z is provided as a compensation factor for RSCP and RSSI, that is, as a compensation of sniffer measurements to HUE measurements performed at the HNB cell boundary where minimum Ecp/Io=−16 dB is to be maintained. As shown in FIG. 5, the path loss is not linear over distance (e.g., the path loss from 0 m to 5 m is about 60 dB while the path loss from 0 m to 10 m is approximately 70 dB). In this example, the value of Z is determined based on FIG. 5 for the predefined and configurable HNB cell radius equal to 5 m (e.g., Z=Path Loss at 10 m−Path Loss at 5 m=70 dB−60 dB=10 dB).

In some embodiments, if the HNB sniffer reports the co-channel best macro CPICH Ec/Io<=−18 dB and both adjacent channel best macro CPICH Ec/Io<=−18 dB and the co-channel best HNB CPICH Ec/Io<=−16 dB and both adjacent channel best HNB CPICH Ec/Ios<=−16 dB, then the Pmax is set at a predetermined or default transmit power level (e.g., 7 dBm or some other setting). In some embodiments, the CPICH power is set to be equal to (Pmax-10) dBm.

In some embodiments, power adaptation for a small area cellular device in a heterogeneous cellular environment includes fine tuning CPICH power using UE measurement reports in addition to using sniffer reports to determine transmit power level. In some embodiments, the small area cellular device (e.g., femtocell, picocell, or microcell) performs the below loop periodically to fine tune the transmit power.

For every W seconds:

---

If min(reported CPICH Ec/Io_i, i=1,2,...,N, where N = number of UEs served by the femtocell) >= -14dB (e.g., or some other value that is better than the above discussed target example of -16dB)
{
  Pmax' = Pmax -1dB;
  Set HNB CPICH Power = (Pmax'-10) dBm;
};

---

Where N=number of UEs served by the HNB, W (e.g., every 1 second or some other time setting value) is a configurable parameter depending on user activities and environment.

Figure 8:
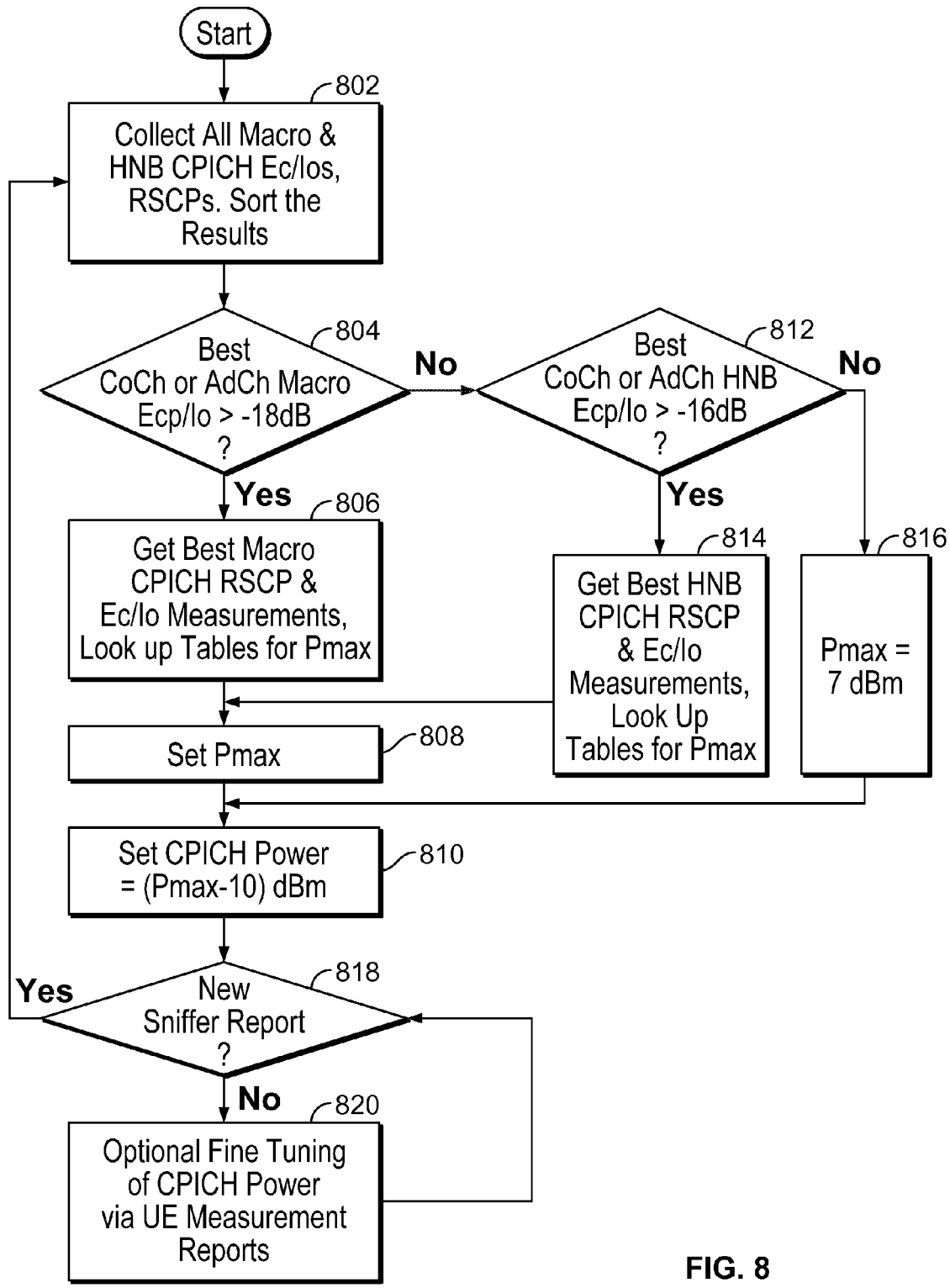
FIG. 8 is a flow diagram illustrating autonomous power adaptation in a heterogeneous cellular environment in accordance with some embodiments.

FIG. 8 is a flow diagram illustrating autonomous power adaptation in a heterogeneous cellular environment in accordance with some embodiments. At 802, macrocell and HNB CPICH Echo data, RSCP data is collected, and the collected results are sorted. At 804, whether the best CoCh or AdCh macrocell Ecp/Io>−18 dB (e.g., to determine whether the first threshold, which can be set at a different threshold value, is exceeded) is determined (e.g., to first prioritize protecting neighboring macrocell(s)). If not, then at 812, whether the best CoCh or AdCh HNB Ecp/Io>−16 dB (e.g., to determine whether the second threshold, which can be set at a different threshold value, is exceeded) is determined. If not, then at 816, a transmit power is set to a default or predetermined level (e.g., 0-15 dBm for femtocells, such as 7 dBm, and 23-27 dBm for picocells, or some other power setting values). If the second threshold is exceeded, then at 814, the transmit power (Pmax) setting for the small area cellular device is determined based on the best HNB CPICH RSCP and Echo measurements (e.g., using various table lookup techniques as discussed above with respect to FIGS. 6 and 7 to provide for the above described Z factor compensation of sniffer measurements to HUE measurements). If the first threshold is exceeded, then at 806, the transmit power (Pmax) setting for the small area cellular device is determined based on the best macrocell CPICH RSCP and Echo measurements (e.g., using various table lookup techniques as discussed above with respect to FIGS. 2 and 3). At 808, the transmit power (Pmax) for the small area cellular device is set. At 810, the CPICH power is set to be equal to (Pmax-10) dBm. At 818, whether a new sniffer report has been received is determined (e.g., such can be performed periodically, such as once per day, once per hour, or some other time interval and/or based on an event, such as a power cycle, or other events, such as errors or interrupts). If a new sniffer report has been received, the process returns to 802. If not, then processing proceeds to 820, and optional fine tuning of CPICH power using UE measurement reports is performed (e.g., using various techniques described herein), and then processing returns to 818.

Figure 9:
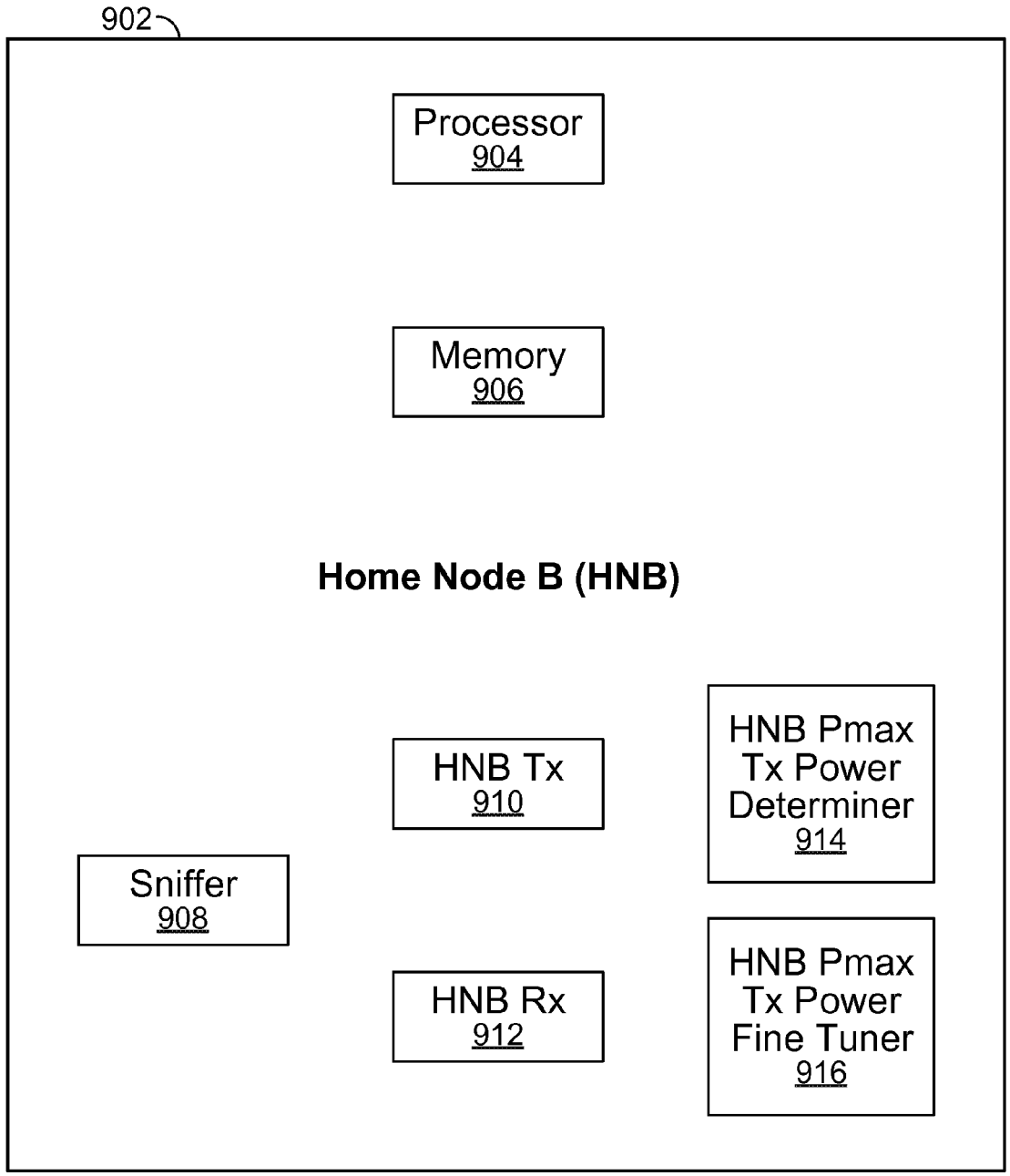
FIG. 9 is a functional diagram for Home Node B device (HNB) for implementing autonomous power adaptation in a heterogeneous cellular environment in accordance with some embodiments.

FIG. 9 is a functional diagram for Home Node B device (HNB) 902 (e.g., femtocell or picocell) for implementing autonomous power adaptation in a heterogeneous cellular environment in accordance with some embodiments. As shown, HNB 902 includes a processor 904 (e.g., for call processing, and for executing program instructions, such as executable code, such as for performing various autonomous power adaptation functions described herein) and a memory 906 (e.g., for call processing data, and for storing executable code, sniffer reports, predetermined settings and thresholds and other data). The HNB 902 also includes a sniffer 908, which performs the sniffer functions described herein. As shown, the HNB 902 further includes an HNB Tx transmitter 910 and HNB Rx receiver 912. The HNB 902 is also shown to include HNB Pmax Tx power determiner 914 for performing the transmit power determination for the HNB using the various techniques described herein (e.g., prioritizing protection of MUE, then neighboring HUE, and then to set within a default setting/power level range). The HNB 902 further includes an HNB Pmax Tx power fine tuner 916 for performing the power fine tuning adjustment techniques as described herein with respect to various embodiments. In some embodiments, the functional HNB architecture as shown in FIG. 9, or other similar architectures as will now be apparent to one of ordinary skill in the art in view of the disclosed embodiments, can be used for implementing autonomous power adaptation in a heterogeneous cellular environment. As will also now be apparent to one of ordinary skill in the art in view of the disclosed embodiments, the various techniques described herein for implementing autonomous power adaptation in a heterogeneous cellular environment are not limited to any particular cellular networking standards (e.g., and applicable to, for example, 3GPP HSPA 3G/4G, LTE, LTE-A, and W-CDMA as well as other cellular networking standards).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for autonomous power adaptation for a first small area cellular device in a heterogeneous cellular environment, comprising:
   a processor configured to:
      collect received signal strength information for one or more neighboring large area cellular devices and one or more neighboring small area cellular devices;
      determine a maximum transmit power for the first small area cellular device that minimizes interference with the one or more neighboring large area cellular devices and the one or more small area cellular devices, wherein determining the maximum transmit power for the first small area cellular device that minimizes interference with the one or more neighboring large area cellular devices and the one or more small area cellular devices includes prioritizing the one or more neighboring large area cellular devices over the one or more neighboring small area cellular devices by prioritizing minimization of interference to macro user equipment devices that belong to neighboring large area cellular devices over minimization of interference to user equipment devices that belong to neighboring small area cellular devices;
      determine whether a first measured signal quality strength for a neighboring macrocell exceeds a first predefined threshold, wherein the first measured signal quality strength for the neighboring macrocell is based on a pilot signal transmitted from the neighboring macrocell;
      if the first measured signal quality strength for the neighboring macrocell is determined to not exceed the first predefined threshold, then determine whether a second measured signal quality strength for a neighboring femtocell or a neighboring picocell exceeds a second predefined threshold, wherein the second measured signal quality strength for the neighboring femtocell or the neighboring picocell is based on a pilot signal transmitted from the neighboring femtocell or the neighboring picocell; and
      if the second measured signal quality strength for the neighboring femtocell or the neighboring picocell is determined to not exceed the second predefined threshold, then set the maximum transmit power of the first small area cellular device to a predetermined transmit power setting, comprising to:
         if the first small area cellular device corresponds to a first type, then set the maximum transmit power of the first small area cellular device to a first predetermined transmit power setting; and
         if the first small area cellular device corresponds to a second type, then set the maximum transmit power of the first small area cellular device to a second predetermined transmit power setting, the first predetermined transmit power setting being different from the second predetermined transmit power setting,
      wherein the first small area cellular device includes a femtocell, a picocell, or a microcell, wherein the one or more neighboring small area cellular devices includes a femtocell, a picocell, and/or a microcell, and wherein the neighboring large area cellular devices include one or more macrocells; and
   a memory coupled to the processor and configured to provide the processor with instructions.

2. The system recited in claim 1, wherein the user equipment devices that belong to neighboring small area cellular devices include one or more home user equipment devices.

3. The system recited in claim 1, wherein the processor is further configured to:
   sort the received signal strength information for the one or more neighboring large area cellular devices; and
   sort the received signal strength information for the one or more neighboring small area cellular devices.

4. The system recited in claim 1, wherein the processor is further configured to:
   determine whether a first measured signal quality strength for a neighboring macrocell exceeds a first predefined threshold, wherein the first measured signal quality strength for the neighboring macrocell is based on a pilot signal transmitted from the neighboring macrocell.

5. The system recited in claim 1, wherein the processor is further configured to:
   determine whether a first measured signal quality strength for a neighboring macrocell exceeds a first predefined threshold, wherein the first measured signal quality strength for the neighboring macrocell is based on a pilot signal transmitted from the neighboring macrocell; and
   if the first measured signal quality strength for the neighboring macrocell is determined to exceed the first predefined threshold, then determine the maximum transmit power for the first small area cellular device such that the first measured signal quality strength at the first small area cellular device cell boundary exceeds the first predefined threshold.

6. The system recited in claim 1, wherein the processor is further configured to:
   determine whether a first measured signal quality strength for a neighboring macrocell exceeds a first predefined threshold, wherein the first measured signal quality strength for the neighboring macrocell is based on a pilot signal transmitted from the neighboring macrocell; and
   if the first measured signal quality strength for the neighboring macrocell is determined to not exceed the first predefined threshold, then determine whether a second measured signal quality strength for a neighboring femtocell or a neighboring picocell exceeds a second predefined threshold, wherein the second measured signal quality strength for the neighboring femtocell or the neighboring picocell is based on a pilot signal transmitted from the neighboring femtocell or the neighboring picocell.

7. The system recited in claim 1, wherein the processor is further configured to:
   determine whether a first measured signal quality strength for a neighboring macrocell exceeds a first predefined threshold, wherein the first measured signal quality strength for the neighboring macrocell is based on a pilot signal transmitted from the neighboring macrocell;
   if the first measured signal quality strength for the neighboring macrocell is determined to not exceed the first predefined threshold, then determine whether a second measured signal quality strength for a neighboring femtocell or a neighboring picocell exceeds a second predefined threshold, wherein the second measured signal quality strength for the neighboring femtocell or the neighboring picocell is based on a pilot signal transmitted from the neighboring femtocell or the neighboring picocell; and
   if the second measured signal quality strength for the neighboring femtocell or the neighboring picocell is determined to exceed the second predefined threshold, then determine the maximum transmit power for the first small area cellular device such that the second measured signal quality strength at the first small area cellular device cell boundary exceeds the second predefined threshold.

8. The system recited in claim 1, wherein the processor is further configured to:
   determine the maximum transmit power for the first small area cellular device such that a measured signal quality strength at the first small area cellular device cell boundary exceeds a predefined threshold using a compensation factor for sniffer measurements for the one or more neighboring femtocells or the one or more neighboring picocells, wherein the compensation factor adjusts for a power loss over a distance based on a configurable radius of the one or more neighboring femtocells or the one or more neighboring picocells.

9. The system recited in claim 1, wherein the processor is further configured to:
   periodically adjust the maximum transmit power of the first small area cellular device based on one or more measurement reports received from one or more user equipment devices based on a fine tuning threshold to fine tune the transmit power of the first small area cellular device.

10. The system recited in claim 1, wherein the processor is further configured to:
    determine whether a new sniffer report is received.

11. A method for autonomous power adaptation for a first small area cellular device in a heterogeneous cellular environment, comprising:
    collecting received signal strength information for one or more neighboring large area cellular devices and one or more neighboring small area cellular devices;
    determining a maximum transmit power for the first small area cellular device that minimizes interference with the one or more neighboring large area cellular devices and the one or more small area cellular devices, wherein determining the maximum transmit power for the first small area cellular device that minimizes interference with the one or more neighboring large area cellular devices and the one or more small area cellular devices includes prioritizing the one or more neighboring large area cellular devices over the one or more neighboring small area cellular devices by prioritizing minimization of interference to macro user equipment devices that belong to neighboring large area cellular devices over minimization of interference to user equipment devices that belong to neighboring small area cellular devices;
    determining whether a first measured signal quality strength for a neighboring macrocell exceeds a first predefined threshold, wherein the first measured signal quality strength for the neighboring macrocell is based on a pilot signal transmitted from the neighboring macrocell;
    if the first measured signal quality strength for the neighboring macrocell is determined to not exceed the first predefined threshold, then determining whether a second measured signal quality strength for a neighboring femtocell or a neighboring picocell exceeds a second predefined threshold, wherein the second measured signal quality strength for the neighboring femtocell or the neighboring picocell is based on a pilot signal transmitted from the neighboring femtocell or the neighboring picocell; and
    if the second measured signal quality strength for the neighboring femtocell or the neighboring picocell is determined to not exceed the second predefined threshold, then setting the maximum transmit power of the first small area cellular device to a predetermined transmit power setting, comprising to:
       if the first small area cellular device corresponds to a first type, then setting the maximum transmit power of the first small area cellular device to a first predetermined transmit power setting; and
       if the first small area cellular device corresponds to a second type, then setting the maximum transmit power of the first small area cellular device to a second predetermined transmit power setting, the first predetermined transmit power setting being different from the second predetermined transmit power setting,
    wherein the first small area cellular device includes a femtocell, a picocell, or a microcell, wherein the one or more neighboring small area cellular devices includes a femtocell, a picocell, and/or a microcell, and wherein the neighboring large area cellular devices include one or more macrocells.

12. The method of claim 11, wherein the user equipment devices that belong to neighboring small area cellular devices include one or more home user equipment devices.

13. The method of claim 11, further comprising:
determining whether a first measured signal quality strength for a neighboring macrocell exceeds a first predefined threshold, wherein the first measured signal quality strength for the neighboring macrocell is based on a pilot signal transmitted from the neighboring macrocell; and
if the first measured signal quality strength for the neighboring macrocell is determined to exceed the first predefined threshold, then determining the maximum transmit power for the first small area cellular device such that the first measured signal quality strength at the first small area cellular device cell boundary exceeds the first predefined threshold.

14. The method of claim 11, further comprising:
determining whether a first measured signal quality strength for a neighboring macrocell exceeds a first predefined threshold, wherein the first measured signal quality strength for the neighboring macrocell is based on a pilot signal transmitted from the neighboring macrocell;
if the first measured signal quality strength for the neighboring macrocell is determined to not exceed the first predefined threshold, then determining whether a second measured signal quality strength for a neighboring femtocell or a neighboring picocell exceeds a second predefined threshold, wherein the second measured signal quality strength for the neighboring femtocell or the neighboring picocell is based on a pilot signal transmitted from the neighboring femtocell or the neighboring picocell; and
if the second measured signal quality strength for the neighboring femtocell or the neighboring picocell is determined to not exceed the second predefined threshold, then setting the maximum transmit power of the first small area cellular device to a predetermined transmit power setting.

15. A computer program product for autonomous power adaptation for a first small area cellular device in a heterogeneous cellular environment, the computer program product being embodied in a non-transitory, tangible computer readable storage medium and comprising computer instructions for:
collecting received signal strength information for one or more neighboring large area cellular devices and one or more neighboring small area cellular devices;
determining a maximum transmit power for the first small area cellular device that minimizes interference with the one or more neighboring large area cellular devices and the one or more small area cellular devices, wherein determining the maximum transmit power for the first small area cellular device that minimizes interference with the one or more neighboring large area cellular devices and the one or more small area cellular devices includes prioritizing the one or more neighboring large area cellular devices over the one or more neighboring small area cellular devices by prioritizing minimization of interference to macro user equipment devices that belong to neighboring large area cellular devices over minimization of interference to user equipment devices that belong to neighboring small area cellular devices;
determining whether a first measured signal quality strength for a neighboring macrocell exceeds a first predefined threshold, wherein the first measured signal quality strength for the neighboring macrocell is based on a pilot signal transmitted from the neighboring macrocell;
if the first measured signal quality strength for the neighboring macrocell is determined to not exceed the first predefined threshold, then determining whether a second measured signal quality strength for a neighboring femtocell or a neighboring picocell exceeds a second predefined threshold, wherein the second measured signal quality strength for the neighboring femtocell or the neighboring picocell is based on a pilot signal transmitted from the neighboring femtocell or the neighboring picocell; and
if the second measured signal quality strength for the neighboring femtocell or the neighboring picocell is determined to not exceed the second predefined threshold, then setting the maximum transmit power of the first small area cellular device to a predetermined transmit power setting, comprising to:
if the first small area cellular device corresponds to a first type, then setting the maximum transmit power of the first small area cellular device to a first predetermined transmit power setting; and
if the first small area cellular device corresponds to a second type, then setting the maximum transmit power of the first small area cellular device to a second predetermined transmit power setting, the first predetermined transmit power setting being different from the second predetermined transmit power setting,
wherein the first small area cellular device includes a femtocell, a picocell, or a microcell, wherein the one or more neighboring small area cellular devices includes a femtocell, a picocell, and/or a microcell, and wherein the neighboring large area cellular devices include one or more macrocells.

16. The computer program product recited in claim 15, wherein the user equipment devices that belong to neighboring small area cellular devices include one or more home user equipment devices.

17. The computer program product recited in claim 15, further comprising computer instructions for:
determining whether a first measured signal quality strength for a neighboring macrocell exceeds a first predefined threshold, wherein the first measured signal quality strength for the neighboring macrocell is based on a pilot signal transmitted from the neighboring macrocell; and
if the first measured signal quality strength for the neighboring macrocell is determined to exceed the first predefined threshold, then determining the maximum transmit power for the first small area cellular device such that the first measured signal quality strength at the first small area cellular device cell boundary exceeds the first predefined threshold.

18. The computer program product recited in claim 15, further comprising computer instructions for:
determining whether a first measured signal quality strength for a neighboring macrocell exceeds a first predefined threshold, wherein the first measured signal quality strength for the neighboring macrocell is based on a pilot signal transmitted from the neighboring macrocell;
if the first measured signal quality strength for the neighboring macrocell is determined to not exceed the first predefined threshold, then determining whether a second measured signal quality strength for a neighboring femtocell or a neighboring picocell exceeds a second predefined threshold, wherein the second measured signal quality strength for the neighboring femtocell or the neighboring picocell is based on a pilot signal transmitted from the neighboring femtocell or the neighboring picocell; and if the second measured signal quality strength for the neighboring femtocell or the neighboring picocell is determined to not exceed the second predefined threshold, then setting the maximum transmit power to a predetermined transmit power setting.

\* \* \* \* \*